United States Patent
Franke et al.

(10) Patent No.: US 11,409,355 B2
(45) Date of Patent: *Aug. 9, 2022

(54) METHOD AND APPARATUS FOR POWER SAVINGS IN COMMUNICATIONS EQUIPMENT

(71) Applicant: International Business Machines Corporation, Armonk, NY (US)

(72) Inventors: Hubertus Franke, Cortlandt Manor, NY (US); Douglas M. Freimuth, New York, NY (US); David P. Olshefski, New York, NY (US); John M. Tracey, Scarsdale, NY (US); Dinesh C. Verma, New Castle, NY (US); Charles P. Wright, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/513,282

(22) Filed: Jul. 16, 2019

(65) Prior Publication Data

US 2019/0339763 A1 Nov. 7, 2019

Related U.S. Application Data

(63) Continuation of application No. 15/400,803, filed on Jan. 6, 2017, now Pat. No. 10,545,567.

(51) Int. Cl.
*G06F 1/32* (2019.01)
*G06F 1/3287* (2019.01)
*G06F 1/3296* (2019.01)

(52) U.S. Cl.
CPC .......... *G06F 1/3287* (2013.01); *G06F 1/3296* (2013.01)

(58) Field of Classification Search
CPC .................................. G06F 1/32; G06F 1/26
See application file for complete search history.

(56) References Cited

U.S. PATENT DOCUMENTS 6,075,817 A  6/2000  Gruenberg
6,374,297 B1 *  4/2002  Wolf ....................... G06F 9/505
707/999.01

(Continued)

OTHER PUBLICATIONS

Kailas, A., "Power Allocation Strategies to Minimize Energy Consumption in Wireless Body Area Networks", Engineering in Medicine and Biology Society, EMBC, 2011, 4 pages.

(Continued)

*Primary Examiner* — Phil K Nguyen
(74) *Attorney, Agent, or Firm* — Amin, Turocy & Watson, LLP

(57) ABSTRACT

Techniques for power savings in communications equipment are provided. The computer-implemented method can comprise identifying, by an electronic device operatively coupled to a processing unit, one or more connectivity requirements of one or more servers associated with a data center. The computer-implemented method can also comprise determining, by the electronic device, a defined graph that satisfies the one or more connectivity requirements. The computer-implemented method can further comprise powering down, by the electronic device, one or more elements of the data center that are not required by the defined graph; and powering up, by the device one or more nodes of the data center, which are in any state other than power up, that are required by the defined graph.

18 Claims, 11 Drawing Sheets

(56) References Cited

U.S. PATENT DOCUMENTS

| | | | |
|---|---|---|---|
| 6,621,808 B1 | 9/2003 | Sadri | |
| 6,631,354 B1 | 10/2003 | Leymann et al. | |
| 6,795,928 B2* | 9/2004 | Bradley | G06F 1/206 713/320 |
| 6,816,902 B1* | 11/2004 | Bandat | G06Q 10/06 709/226 |
| 7,162,250 B2 | 1/2007 | Misra | |
| 7,339,897 B2 | 3/2008 | Larsson et al. | |
| 7,441,135 B1* | 10/2008 | Chan | G06F 1/3203 713/320 |
| 7,458,050 B1 | 11/2008 | Arbel et al. | |
| 8,271,807 B2 | 9/2012 | Jackson | |
| 8,700,929 B1 | 4/2014 | Weber et al. | |
| 8,930,731 B2 | 1/2015 | Agneeswaran et al. | |
| 9,170,912 B1 | 10/2015 | Hu et al. | |
| 10,169,083 B1* | 1/2019 | Florissi | H04L 67/10 |
| 2004/0088147 A1* | 5/2004 | Wang | G06Q 10/10 703/2 |
| 2004/0215904 A1 | 10/2004 | Gopisetty et al. | |
| 2005/0165925 A1* | 7/2005 | Dan | H04L 67/325 709/224 |
| 2006/0212691 A1 | 9/2006 | Wood et al. | |
| 2007/0130341 A1 | 6/2007 | Ma | |
| 2008/0136638 A1 | 6/2008 | Deolaliker et al. | |
| 2009/0077398 A1* | 3/2009 | Bland | G06F 1/3209 713/320 |
| 2009/0158074 A1* | 6/2009 | Oh | G06F 1/3203 713/340 |
| 2009/0161542 A1 | 6/2009 | Ho | |
| 2009/0235097 A1* | 9/2009 | Hamilton | G06F 1/3203 713/320 |
| 2009/0287720 A1 | 11/2009 | Herter et al. | |
| 2010/0110937 A1 | 5/2010 | Vennelakanti et al. | |
| 2010/0191994 A1 | 7/2010 | Nurminen et al. | |
| 2010/0218005 A1* | 8/2010 | Jain | G06F 9/5094 713/300 |
| 2011/0161858 A1 | 6/2011 | Barber et al. | |
| 2012/0123602 A1 | 5/2012 | Sun et al. | |
| 2013/0297280 A1 | 11/2013 | Feng et al. | |
| 2014/0022945 A1* | 1/2014 | Verchere | H04L 12/12 370/254 |
| 2014/0223325 A1 | 8/2014 | Melendez et al. | |
| 2015/0220134 A1* | 8/2015 | Zhou | G06F 1/3203 713/320 |
| 2016/0099860 A1 | 4/2016 | Huang | |
| 2017/0111976 A1 | 4/2017 | Van Endert | |
| 2017/0373535 A1* | 12/2017 | Dam | H02J 3/00 |
| 2018/0137858 A1 | 5/2018 | Saxena et al. | |

OTHER PUBLICATIONS

Vereecken et al., "Power Consumption in Telecommunication Networks: Overview and Reduction Strategies", IEEE Communications Magazine, vol. 49, Issue 6, Jun. 2011, 6 pages.

Breslin, Mike, "New Technology Reduces Power Consumption for Information and Communications Equipment", URL: http://www.ecmag.com/section/miscellaneous/new-technology-reduces-power-consumption-information-and-communications. Electrical Contractor, Mar. 2010, 3 pages.

Kuribayashi, Shin-ichi, "Reducing Total Power Consumption Method in Cloud Computing Environments", International Journal of Computer Networks & Communications, vol. 4, No. 2, Mar. 2012, pp. 69-84.

Schmidt, C., "How Industrial Manufacturers Can Reduce Power Consumption", URL: https://solutions.borderstates.com/guest-post:-how-industrial-manufacturers-can-reduce-power-consumption/, BorderStates, Jan. 22, 2015, 6 pages.

Yanagihara et al., "Power consumption reduction for wireless smart networks", OKI Technical Review, vol. 79, No. 1, Issue 219, Apr. 2012, 4 pages.

Nakamura et al., "Reducing Datacenter Energy Consumption Using Coordinated ICT-cooling Control Technology of Datacenter Energy Management System", NTT Technical Review, vol. 11, No. 1, Jan. 2013, 7 pages.

Trehan, Anil, "Chill Out! Here's How You Reduce Power Consumption in Cooling Shelters", URL: http://www.commscope.com/Biog/Chiii-Out!-Here-s-How-You-Reduce-Power-Consumption-in-Cooling-Shelters/, Commscope, Feb. 20, 2012, 5 pages.

Xing et al., "Minimum Power Configuration for Wireless Communication in Sensor Networks", ACM Transactions on Sensor Networks, vol. 3., No. 2, Jun. 2007, 33 pages.

D'Souza et al., "Global Connectivity from Local Geometric Constraints for Sensor Networks with Various Wireless Footprints", IPSN '06, Apr. 19-21, 2006, pp. 19-26.

Gupta et al., "Efficient Gathering of Correlated Data in Sensor Networks", ACM Transactions on Sensor Networks, vol. 4, No. 1, Jan. 2008, pp. 4:1-4:31.

Thanayankizil et al., "Energy-Efficient Strategies for Cooperative Communications in Wireless Sensor Networks", Sensor Technologies and Applications, SensorComm, 2007, 6 pages.

Non-Final Office Action received for U.S. Appl. No. 15/400,803 dated Aug. 9, 2018, 41 pages.

Non-Final Office Action received for U.S. Appl. No. 15/836,807 dated Aug. 9, 2018, 37 pages.

List of IBM Patents or Applications treated as related.

Non-Final Office Action received for U.S. Appl. No. 15/400,803 dated Mar. 7, 2019, 37 pages.

Non-Final Office Action received for U.S. Appl. No. 15/836,807 dated Mar. 7, 2019, 36 pages.

Keshavarzian et al., "Wakeup Scheduling in Wireless Sensor Networks", Robert Bosch Corporation, Research and Technology Center, MobiHoc, May 22-25, 2006, 12 pages.

Non-Final Office Action received for U.S. Appl. No. 16/540,647 dated Sep. 17, 2020, 73 pages.

* cited by examiner

METHOD AND APPARATUS FOR POWER SAVINGS IN COMMUNICATIONS EQUIPMENT

BACKGROUND

The subject disclosure relates to power savings systems to reduce power consumption in communications equipment.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate power savings in communications equipment are described.

According to an embodiment, a computer-implemented method comprises: identifying, by a device operatively coupled to a processor, one or more connectivity requirements of one or more nodes associated with a data center; determining, by the device, a defined graph that satisfies the one or more connectivity requirements; powering down, by the device, one or more nodes of the data center that are not required by the defined graph; and powering up, by the device one or more nodes of the data center, which are in any state other than power up, that are required by the defined graph.

In accordance with another embodiment, a computer-implemented system that regulates power of nodes of a data center, comprises: a processing unit; a memory, operatively coupled to the processing unit, that stores computer executable components; a load analysis component that determines load of the data center, and generates a defined graph of a set of nodes of the data center required to fulfill system or capacity requirements of the data center; and a power regulation component that regulates power to respective nodes of the data center based at least in part on whether respective nodes fall within or outside of the defined graph.

In yet another embodiment, a computer program product that facilitates power regulation of network appliances of a data center, the computer program product comprises a computer readable storage medium having program instructions embodied therewith, the program instructions executable by a processor to cause the processor to: identify, by a device operatively coupled to a processor, one or more connectivity requirements of one or more network appliances associated with the data center; determine, by the device, a defined graph that satisfies the one or more connectivity requirements of the network appliances, and interdependencies of the network appliances; power down, by the device, a subset of the network appliances that are not required by the defined graph; and powering up, by the device one or more nodes of the data center, which are in any state other than power up, that are required by the defined graph.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Throughout the drawings, the same or similar reference numerals represent the same or similar elements.

DETAILED DESCRIPTION

Figure 1:
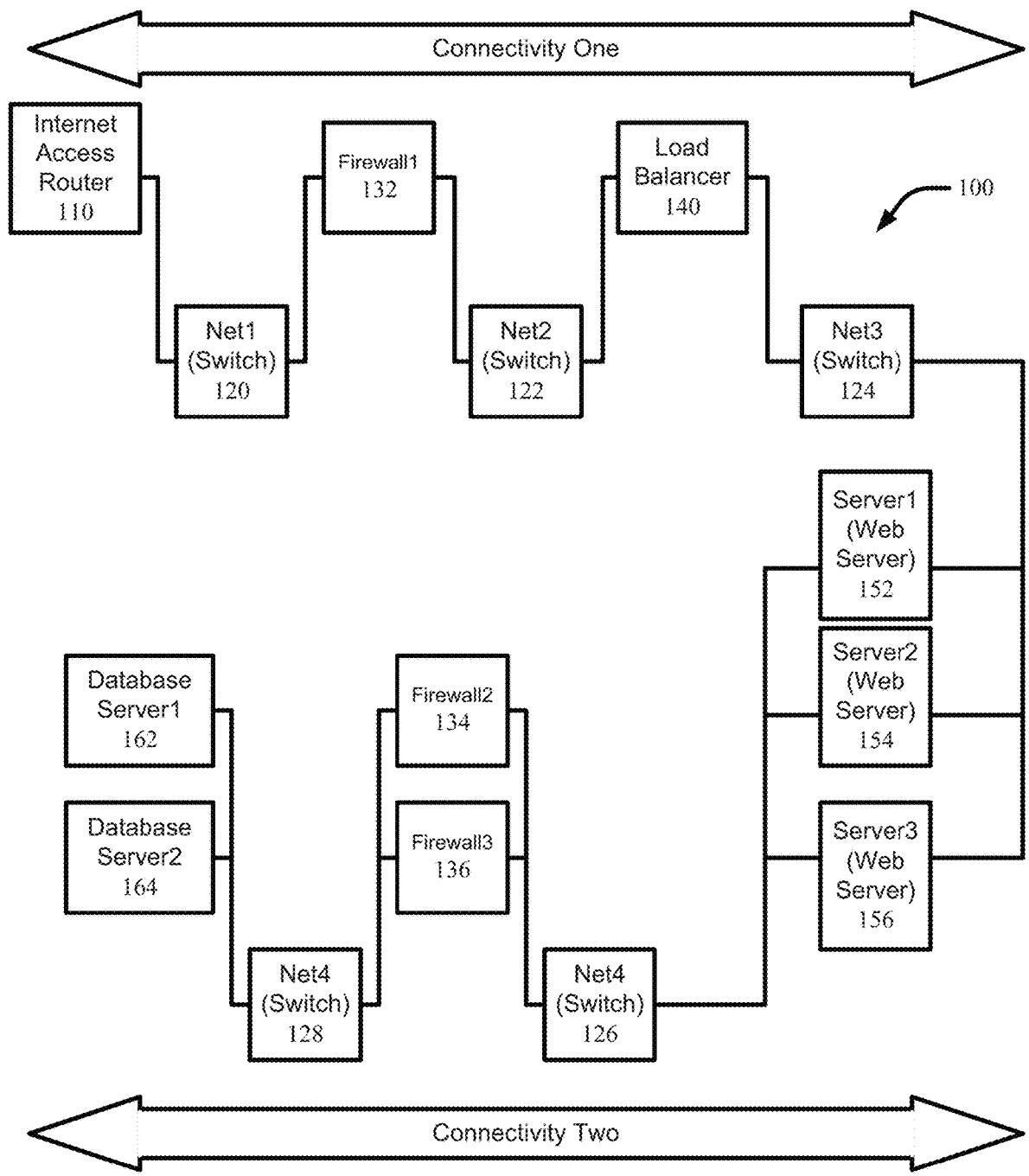
FIG. 1 illustrates a block diagram of an example, defined graph that reduces power consumption of nodes (e.g., network appliances) in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various embodiments, that the one or more embodiments can be practiced without these specific details.

The number of large data centers continue to rapidly increase year over year. As power requirements to run such large data centers are becoming increasingly costly, research has been focused on mitigating unnecessary power consumption and some research shows that a significant amount, e.g., 15-30% of power in a data center is consumed by communications equipment depending on type of configuration employed. Although various developments are underway to consolidate servers and storages to reduce power consumption, there are few techniques available to reduce power consumption by communications equipment, mainly because one or more communications equipment come from different network vendors, and determining let alone navigating inter-dependencies associated therewith is difficult. In this disclosure, system(s) and method(s) to reduce the power consumption of nodes (e.g., servers, network appliances, communications equipment, devices, etc.) by powering down nodes not currently required to meet system capacity requirements is provided.

One particular concept of reducing power consumption in server racks is to minimize number of servers that need to be turned on using virtualization techniques. With respect to network equipment, similar techniques are difficult to apply since connectivity of different appliances and their respective functions play a role regarding whether the functions can be properly provided. However, if required connectivity of one or more network devices can respectively be provided so as to preserve respective functionalities, then set(s) of devices that should be powered on to maintain the required connectivity as well as set(s) of devices that can be powered down without losing required functionalities can be identified.

Embodiments described and claimed herein can be implemented via a series of acts. In a first act, type of connectivity that is required within a data center is determined. In a second act, a system can determine a minimum possible interconnectivity topology required to support proper operations; and in a third act the system can regulate power of elements to support a desired level of connectivity and system/capacity requirements. The connectivity in a datacenter that is required can be one of the following, non-limiting examples: Connectivity among an access-point (e.g. Internet) and a set of servers. Connectivity among one or more tiers of which each tier consists of a set of servers or storage systems. In some embodiments, end-points of a desired connectivity can be identified. For example, the following can be enumerated: a set of applications and servers that need to be exposed to the external Internet; and a set of nodes that need to communicate with one another.

Embodiments described and claimed herein can utilize machine learning systems that have been explicitly or implicitly trained to learn, determine or infer system needs, capacity requirements, interdependencies of nodes, and dynamically determine or infer graphs of nodes that achieve current and/or anticipated system/capacity requirements. Links in a standard network represent connectivity, providing information about how one node can be reached from another. Dependency links represent a need for support from one node to another. This relationship is often, though not necessarily, mutual and thus the links can be directed or undirected. Crucially, a node loses its ability to function as soon as the node it is dependent on ceases to function while it may not be so severely effected by losing a node it is connected to. In percolation theory, a node is considered active as long as it is connected to a giant component. The introduction of dependency links adds another condition: that the node that it depends on is also active. Dependency can be defined between different networks and also within a same network. Interdependent networks have markedly different percolation properties than single-networks. If a single network is subjected to random attack, the largest connected component decreases continuously with a divergence of its derivative at the percolation threshold, a second-order phase transition. However, when multiple networks are interdependent, cascading failures emerge due to the positive feedback caused by dependency links. This family of processes causes a discontinuous or first order phase transition. Surprisingly, it has been shown that—contrary to the results for single networks—interdependent random networks with broader degree distributions are more vulnerable than those with narrow degree distributions. The high degree which is an asset in single networks can be a liability in interdependent networks. This is because the hubs which increase robustness in single networks can be dependent on vulnerable low-degree nodes.

Embodiments described herein learn interdependencies of nodes within a data center, e.g., utilizing machine learning systems that learn the set of nodes and respective linkages and interdependencies, and can build models that are explicitly or implicitly trained to generate robust defined graphs of sets of nodes that provide desired functionalities. These defined graphs converge a superset of nodes to a subset of nodes that are required to provide a desired complete set of operations and functionalities. Accordingly, such defined graphs provide opportunity to apply power conservation techniques (e.g., powering down, standby mode, low power consumption mode, etc.) to nodes that are not within the subset of nodes of the defined graph. In other words, such nodes outside of the defined graph are not necessary to fulfill operational requirements of the data center for a current period of time, and this do not need to be fully powered, which provides cost-savings and device life extension advantages.

The subject disclosure is directed to computer processing systems, computer-implemented methods, apparatus and/or computer program products that facilitate efficiently and automatically (e.g., without direct human involvement) regulating node utilization. Humans are also unable to perform the embodiments described here as they include, and are not limited to, performing e.g., complex Markov processes, Bayesian analysis, or other artificial intelligence based techniques based on probabilistic analyses and evaluating electronic information indicative of node utilization, determining whether countless multitudes of probability values assigned to node utilization exceed or fall below various probability values.

The computer processing systems, computer-implemented methods, apparatus and/or computer program products employ hardware and/or software to solve problems that are highly technical in nature. For example, problems are related to automated processing, determining or inferring node utilization. These problems are not abstract and cannot be performed as a set of mental acts by a human. For example, a human, or even thousands of humans, cannot efficiently, accurately and effectively manually apply countless thousands of node utilization variables to input points and perform analysis to determine that a probability value assigned to a node utilization level exceeds a defined probability value.

In order to provide for or aid in the numerous inferences described herein (e.g. inferring node utilization requirements), components described herein can examine the entirety or a subset of data to which it is granted access and can provide for reasoning about or inferring states of a system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIG. 1 illustrates a block diagram of an example, non-limiting topology of communications equipment in accordance with one or more embodiments described herein. The identification of communication characteristics typically involves calling out nodes (e.g., servers, storage, network appliances, devices, equipment, access points, etc.) that need to be able to communicate with each other. The path for communication between these nodes can pass through several intermediary nodes. FIG. 1 discloses an example, non-limiting desired connectivity for a two-tiered data center.

Connectivity one and connectivity two are example, non-limiting desired connectivity in a network configuration. Connectivity one can provide a connection between Internet access router 110 and a group of three web servers 152, 154, and 156. Connectivity two can provide a connection between a group of three web servers 152, 154, and 156 and a group of two database servers 162 and 164. A firewall 132, network switches 120, 122, and 124, and a load balancer 140 that are shown herein are examples of communications equipment available in different paths.

Using knowledge of type of desired connectivity, a topology of an interconnection among different points can be optimized to reduce power consumption. In some embodiments, there can be redundant components, e.g., firewall 2 and firewall 3. In this regard, an analysis of the network topology as well as system capacity requirements, e.g., low external communications activity, can reveal that power savings can be achieved by powering down redundant firewall 3 136 since firewall 2 134 performs the same function. However, as system capacity requirements change, e.g., external communications increase or higher threat of security breaches is inferred or detected, firewall 3 136 can be powered up based on the new system requirements and associated desired graph to satisfy such requirements.

Figure 2:
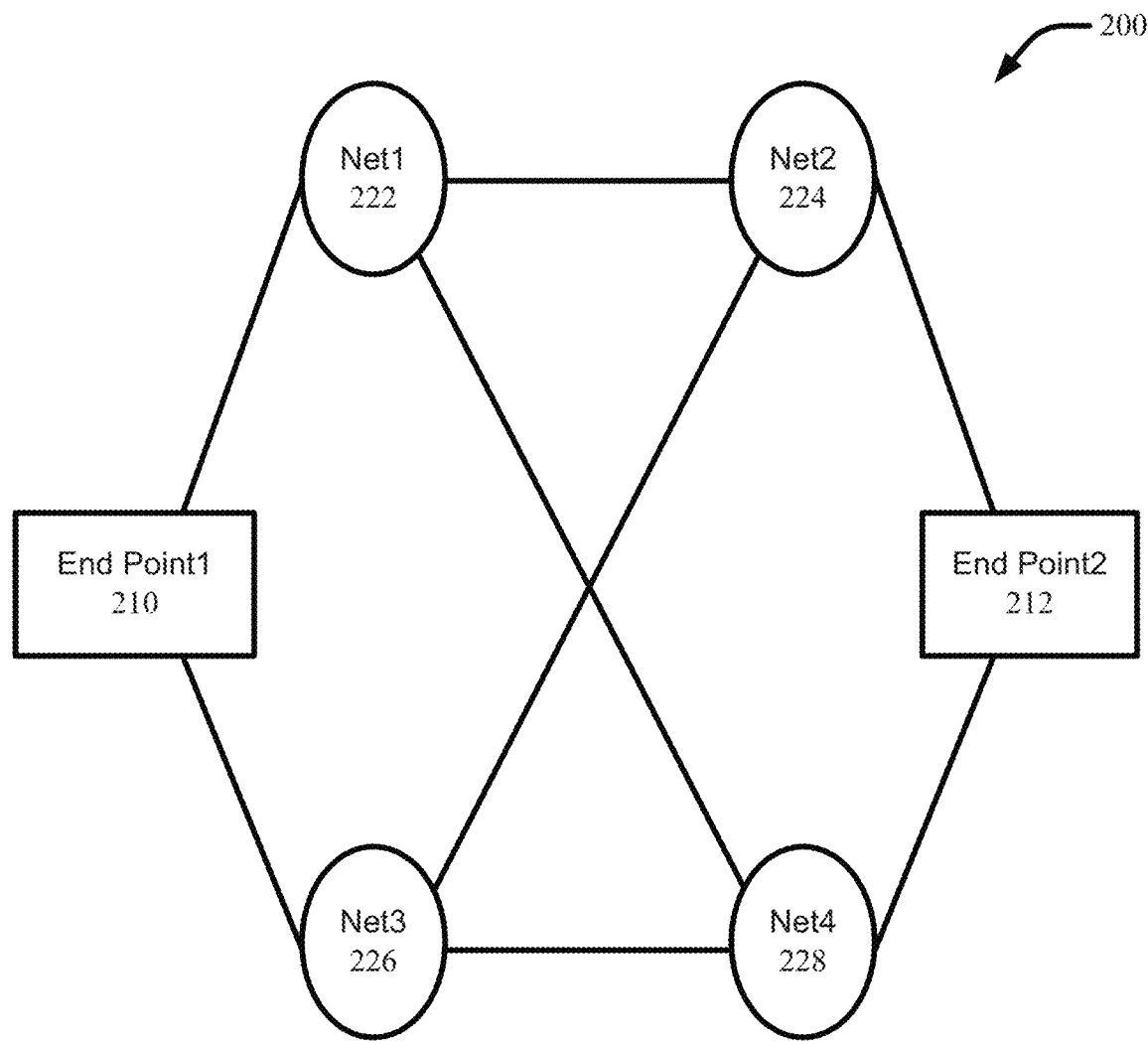
FIG. 2 illustrates a block diagram of an example, non-limiting redundant interconnection in accordance with one or more embodiments described herein.

FIG. 2 illustrates a block diagram of an example, non-limiting topology that utilizes a redundant interconnection in accordance with one or more embodiments described herein. There can be redundant paths along two different end-points 210, 212. This redundant path situation can arise commonly when Internet access router 110 are used to provide redundant paths among the two different end-points 210, 212. FIG. 2 shows one such situation.

In some embodiments, acts can be taken to reduce power consumed by respective nodes devices. For example, in response to identified redundant paths, only a shortest path among end-points 210 and 212 is required to be maintained. The alternative paths, and devices there among can be placed in standby mode to reduce power consumption. In certain instances where several different elements in the aggregate perform a particular function, network paths can be reconfigured to provide such function. As an example, if the network connectivity is provided by virtual LANs, then the VLANs can be configured so that they all utilize a single device for reliability. As an example, the different network switches of FIG. 1 can be replaced with a single network switch. When there are several network appliance functions along a single path, then those functions can be consolidated on a single device. If the devices are implemented as a consolidated appliance on a multi-core platform, then such a consolidation is feasible.

Based on the result of these transformations, a topology of appliances can be identified which comprises a minimum set that can provide desired connectivity among the different end-points 210 and 212 of a communication path. The other devices can then be turned off or placed in power savings mode to conserve power as well as reduce device operating hours. The techniques described herein can also be implemented in a planning tool to design deployments of new networks, or during operation as a tool to adjust the configuration of different network appliances available.

Figure 3:
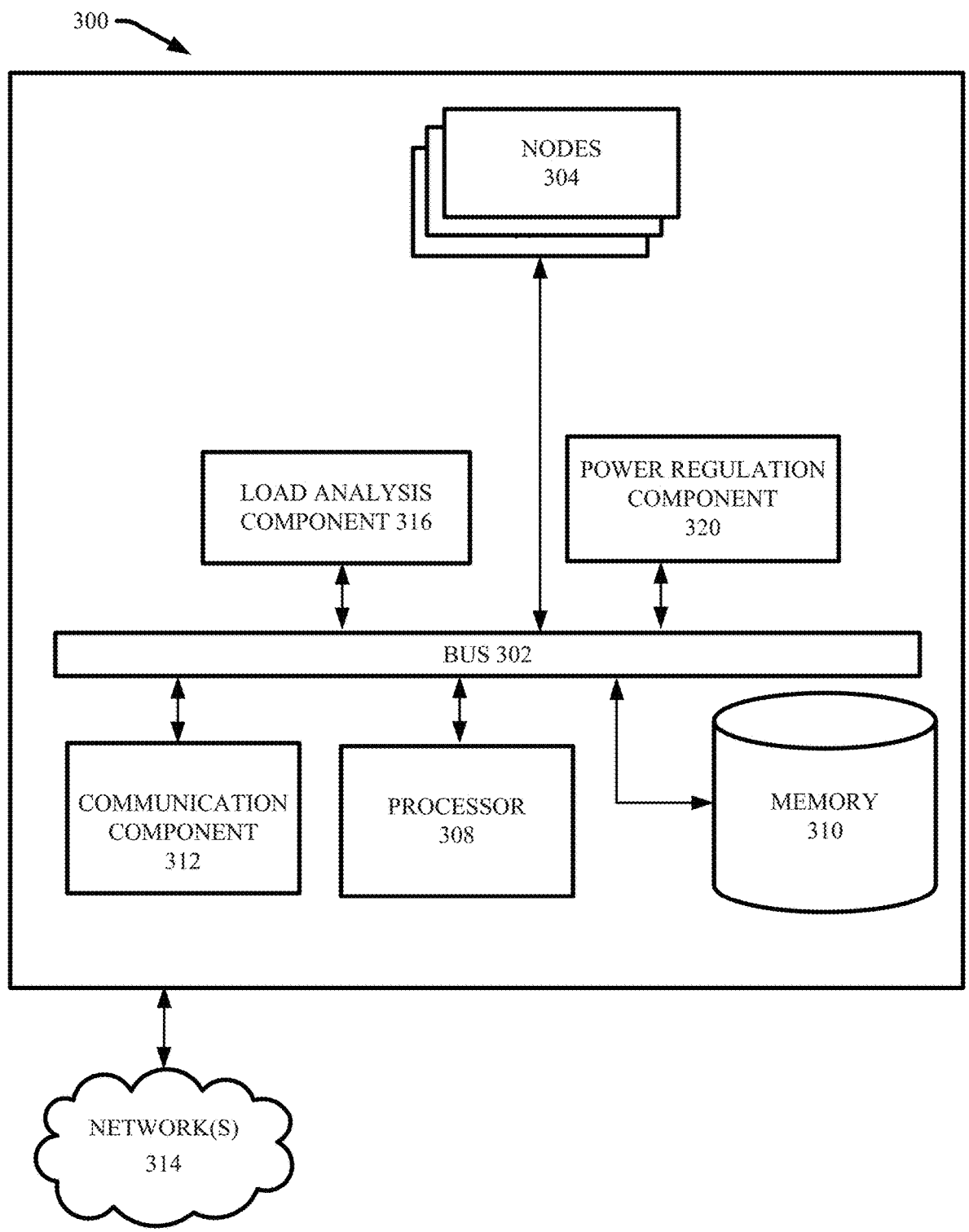
FIG. 3 illustrates a block diagram of an example, non-limiting power regulation system in accordance with one or more embodiments described herein.

FIG. 3 illustrates a block diagram of an example, non-limiting power savings system in accordance with one or more embodiments described herein. The system 300 includes a bus 302 that provides for interconnection of various components of the system 300. It is to be appreciated that in other embodiments one or more system components can communicate wirelessly with other components, through a direct wired connection or integrated on a chipset.

The system 300 includes a set of nodes 304 (e.g., servers, network appliances, communication equipments, general purpose computers, motors, pumps, devices, equipment, a mobile computer, a control system, a global positioning system (GPS), a tracking system, a weather computer, an emergency system, a communication system, a warning system, a radar system, or any other suitable computing device, etc.).

A processor 308 executes computer executable components/software stored thereon or in memory 310. A power regulation component 310 can include or otherwise be associated with at least one power control device. Non-limiting examples include a relay, a voltage regulator, and/or any other power interrupting device that can be controlled locally and/or remotely. In some embodiments, power regulation components are implemented within an external AC-to-DC adapter and within power regulation circuitry so that a motherboard switching regulator, a primary regulator within the main computer casing, is not required to regulate power before being transmitted to the network.

The various components (e.g., processor 308, memory 310, and/or other components) of system 300 can be connected to a communications component 312 either directly or via one or more networks 314. Such networks 314 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

A load analysis component 316 can analyze system and/or capacity requirements and identify topologies or desired graphs to satisfy such requirements. For example, the load analysis components can analyze one or more connectivity requirements, determine a defined graph that satisfies the one or more connectivity requirements, drive power regulation component 320 to ensure that a subset of nodes 304 that fall within the defined graph remain powered on to satisfy system and capacity requirements, and nodes 304 that fall outside the graph are powered down or placed in standby or power savings mode to conserve overall power consumption by nodes 304. It should be appreciated that in certain embodiments the defined graph(s) for applying power regulation are not static but rather dynamic and are updated based on changes in system and/or capacity requirements. Accordingly, nodes are selectively activated, deactivated, placed in standby or power savings mode as required.

Figure 4:
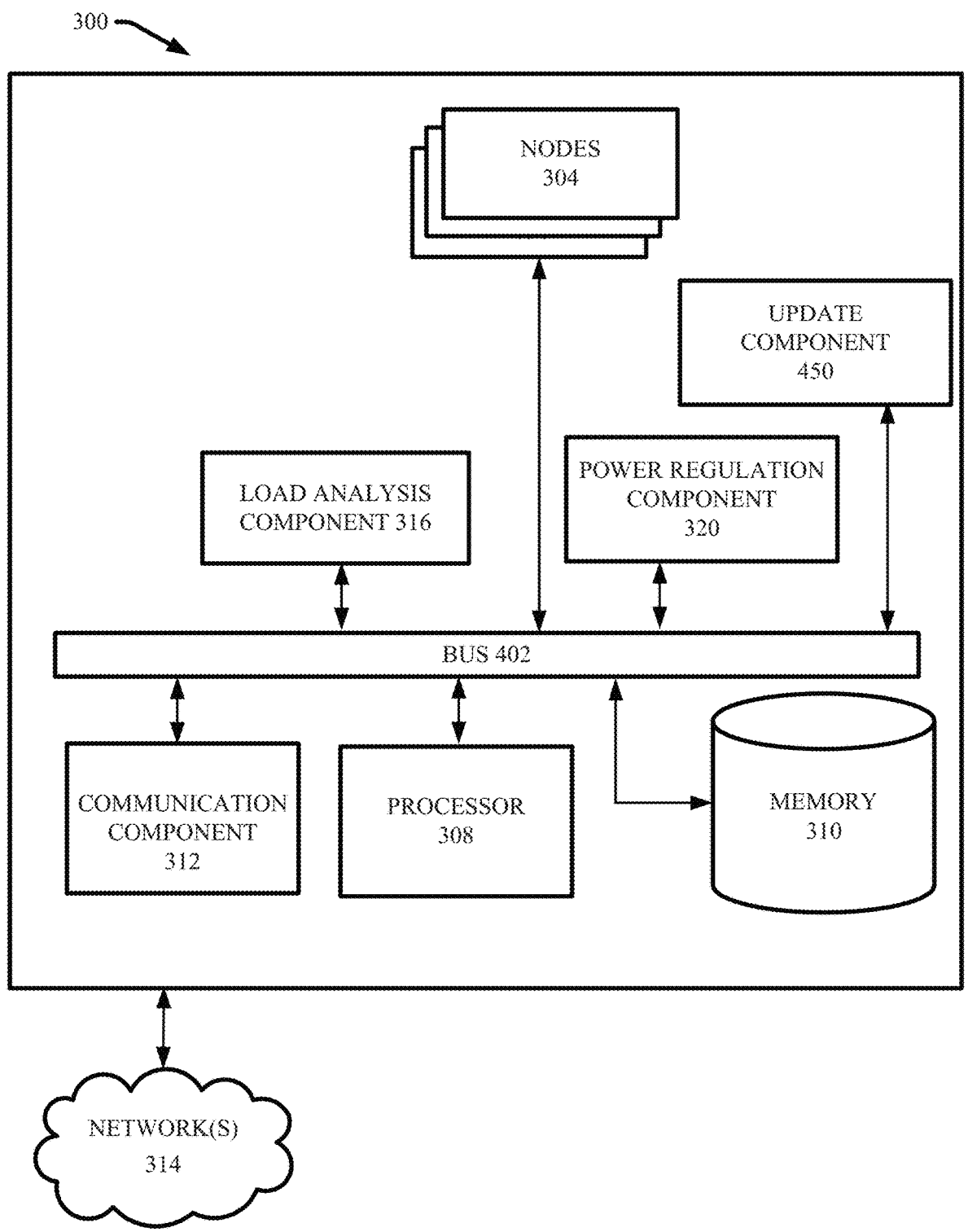
FIG. 4 illustrates an alternative embodiment of an example, non-limiting power regulation system in accordance with one or more embodiments described herein.
Figure 5:
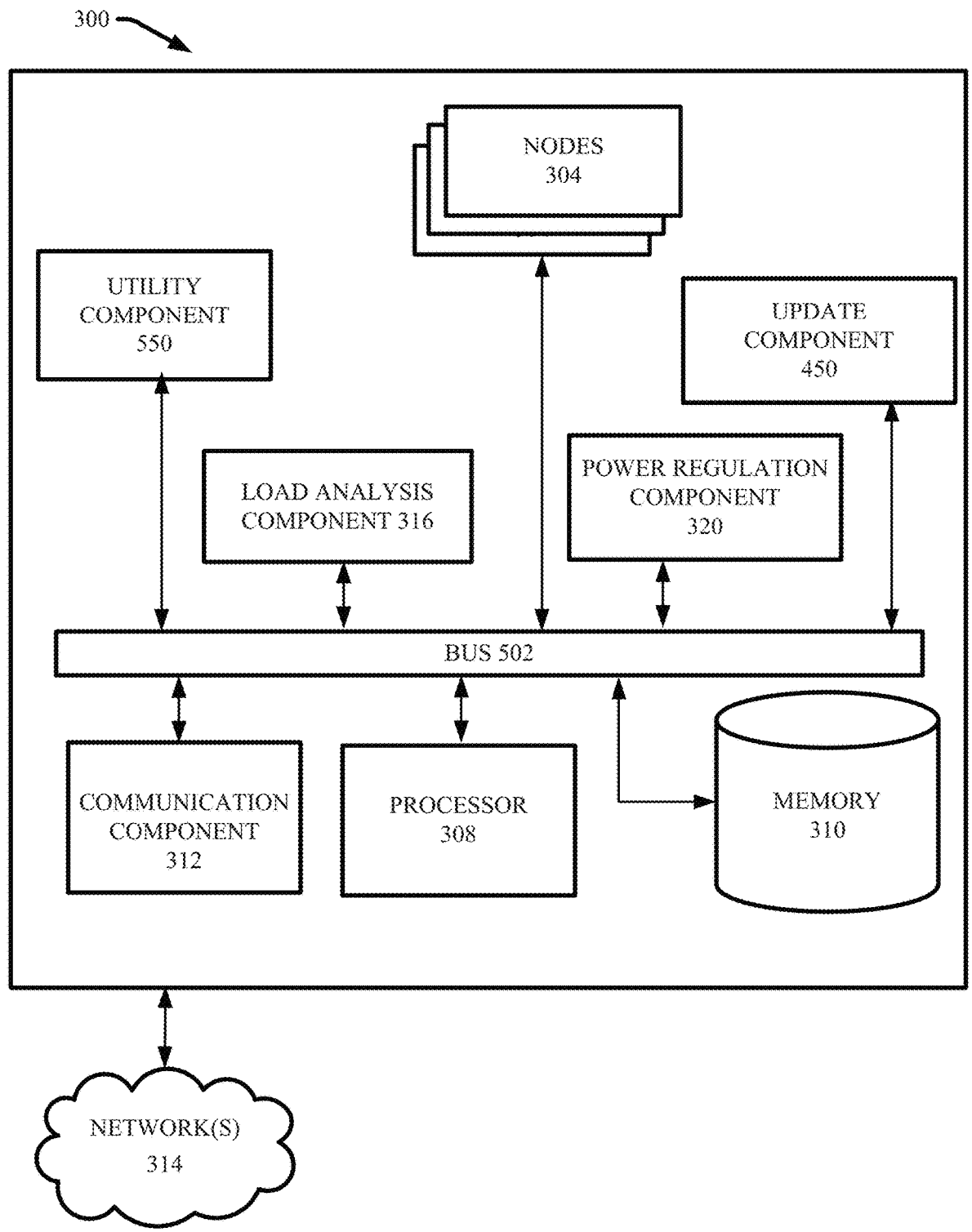
FIG. 5 illustrates an alternative embodiment of an example, non-limiting power regulation system in accordance with one or more embodiments described herein.

FIG. 4 illustrates an alternative implementation of system 300 that includes an update component 450. An update component 450 can update the graph generated by the load analysis component 316 based on revised system or capacity requirements. For example, if the system 300 was serving the European and Asian markets, and the time changed to 8:00 am EST where U.S. businesses have started working, system and capacity demand can increase and this update component 450 can coordinate with load analysis component 316 and power regulation component 320 to update the graph based on increased demand and thus activate nodes 304 that were previously powered down, in standby or in power savings mode for example. Likewise, as demand decreases, e.g., after business hours in Europe and the Americas, system and capacity requirements can decrease thus prompting the update component 450 to update the graph and causing a subset of active nodes 304 to be powered down, placed in standby mode or power savings mode in order to conserve power and/or minimize operating hours of the nodes to extend device life. FIG. 5 illustrates an alternative implementation of system 300 that includes a utility component 550. The utility component 550 can be employed to perform a cost/benefit analysis in connection with power regulation of the nodes 304 and pros/cons associated with powering up or down respective nodes 304. A utility-based analysis can also be employed where the costs of taking a certain action are weighed against the benefits. For example, the utility component 550 can determine that the probability and cost of potentially failing to provision services to a set of customers outweighs the financial benefit of turning down certain nodes (e.g., equipment).

Figure 6:
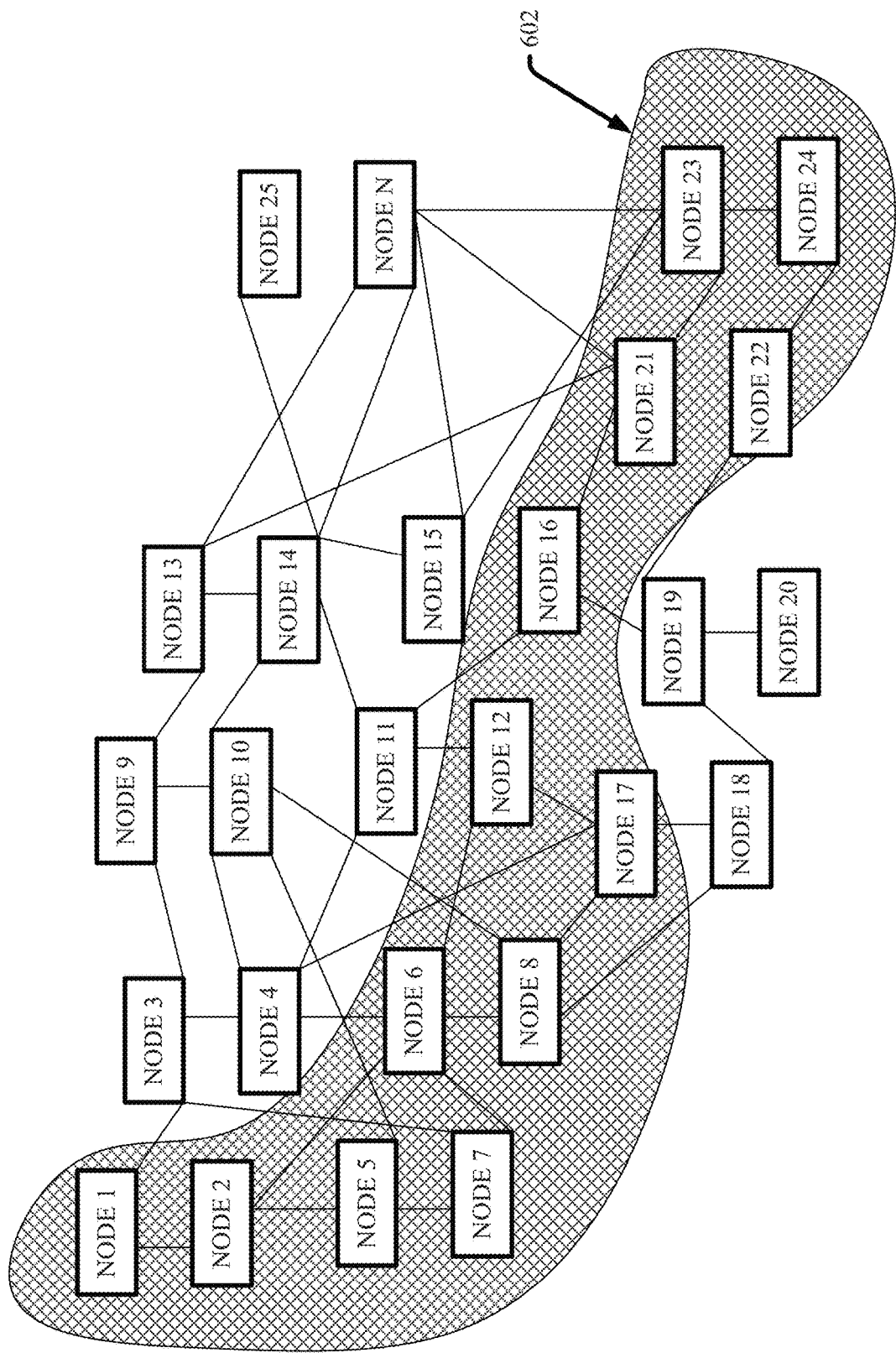
FIG. 6 illustrates a block diagram of an example, defined graph of nodes (e.g., network appliances) in accordance with one or more embodiments described herein.
Figure 7:
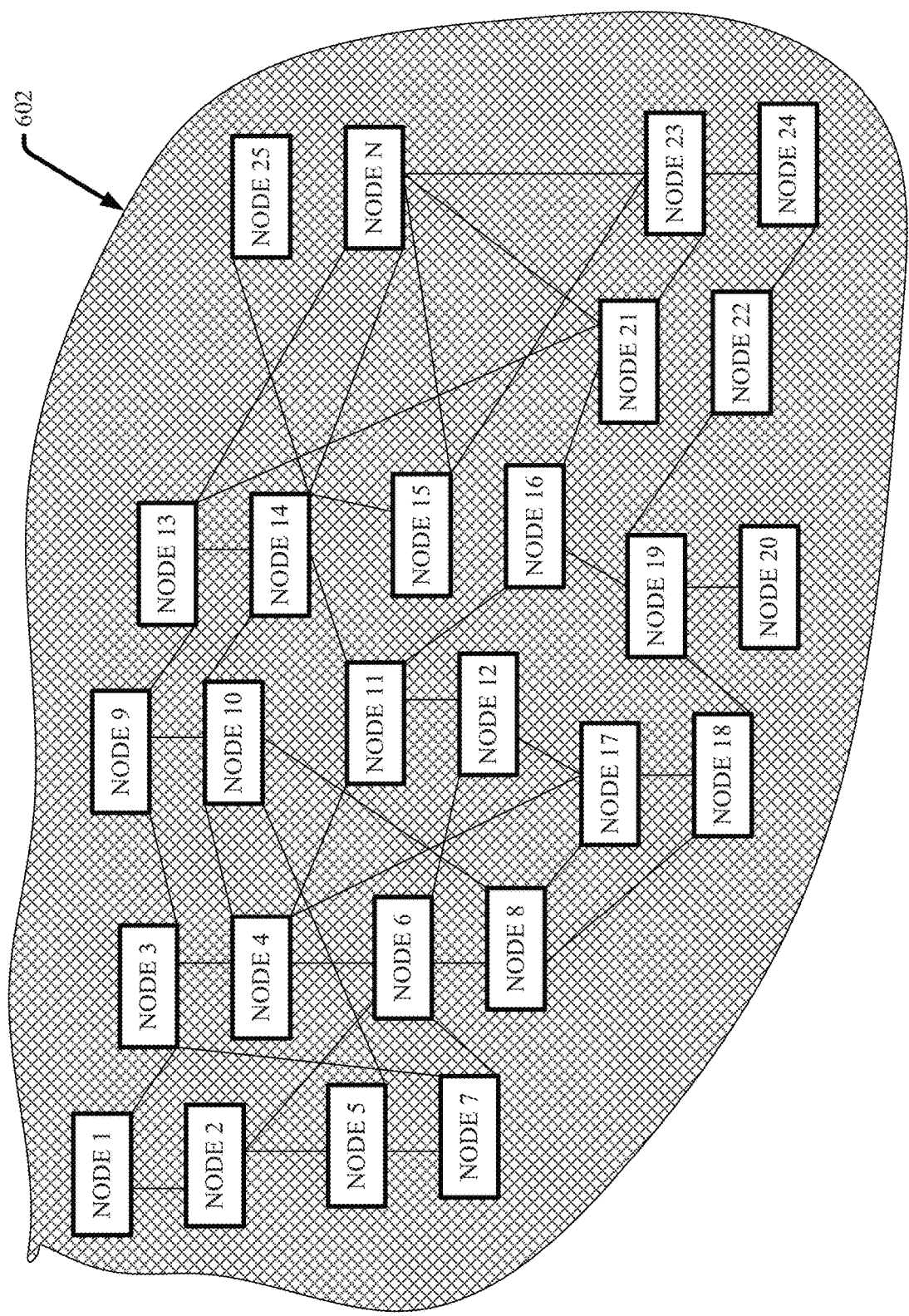
FIG. 7 illustrates a block diagram of an example, defined graph of nodes (e.g., network appliances) in accordance with one or more embodiments described herein.
Figure 8:
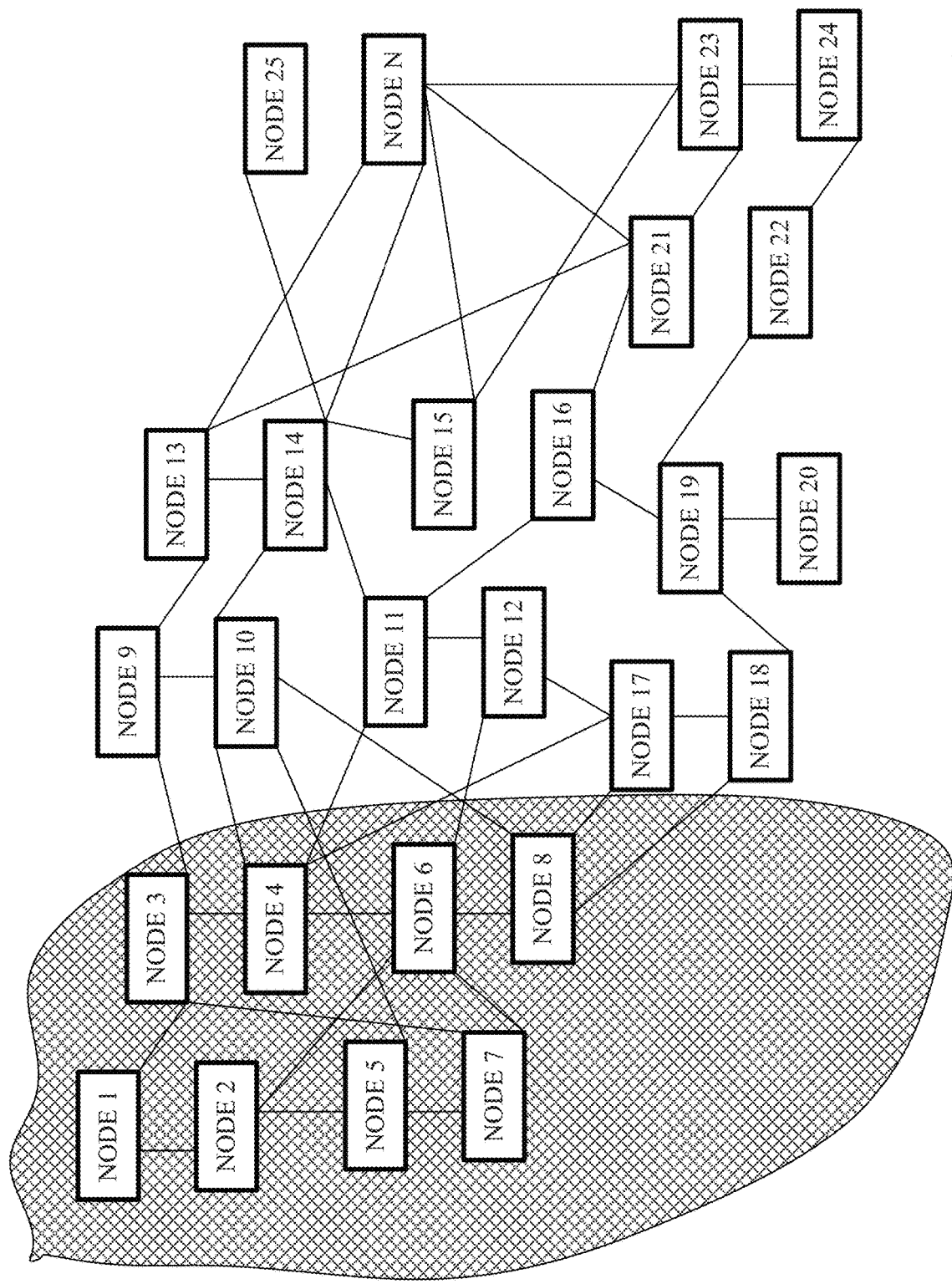
FIG. 8 illustrates a block diagram of an example, defined graph of nodes (e.g., network appliances) in accordance with one or more embodiments described herein.

FIGS. 6-8 schematically illustrate a defined graph 602 as applied to a set of nodes 1-N, wherein N is an integer. In FIG. 6, the defined graph 602 identifies a set of nodes (nodes: 1, 2, 3, 6, 8, 12, 16, 17, 21, 22, 23 and 24) that are deemed necessary to satisfy system and/or capacity requirements. FIG. 7 illustrates a change in the defined graph 602 based on changes in system and/or capacity requirements. In this situation, there is peak demand requiring all nodes 1-N to be fully operational. FIG. 8 illustrates an alternative scenario where demand is at a lower level, and thus the graph indicates that only nodes 1-8 are necessary to fulfill changed system or capacity requirements. The load analysis component 316, power regulation component 320, update component 450 and utility component 550 can coordinate to adjust the graph based on current or anticipated needs, and accordingly power-up, power down, place in standby or power savings mode for example as needs of the system 300 change. Thus, significant power savings can be achieved through such selective control of nodes and in particular network appliances. The defined graph 602 provides for assessing network and connectivity requirements across the set of nodes and providing a mapping of nodes necessary to fulfill desired operations. It is to be appreciated that machine learning systems can be implemented in one or more of the components to generate explicitly and/or implicitly trained models that provide the desired graphs to map nodes necessary to provide respective functions. The machine learning systems can learn systems, networks, etc., identify interdependencies of respective nodes and correlations in order to determine or infer graphs that mitigate downtime and reliably achieve system objectives.

Figure 9:
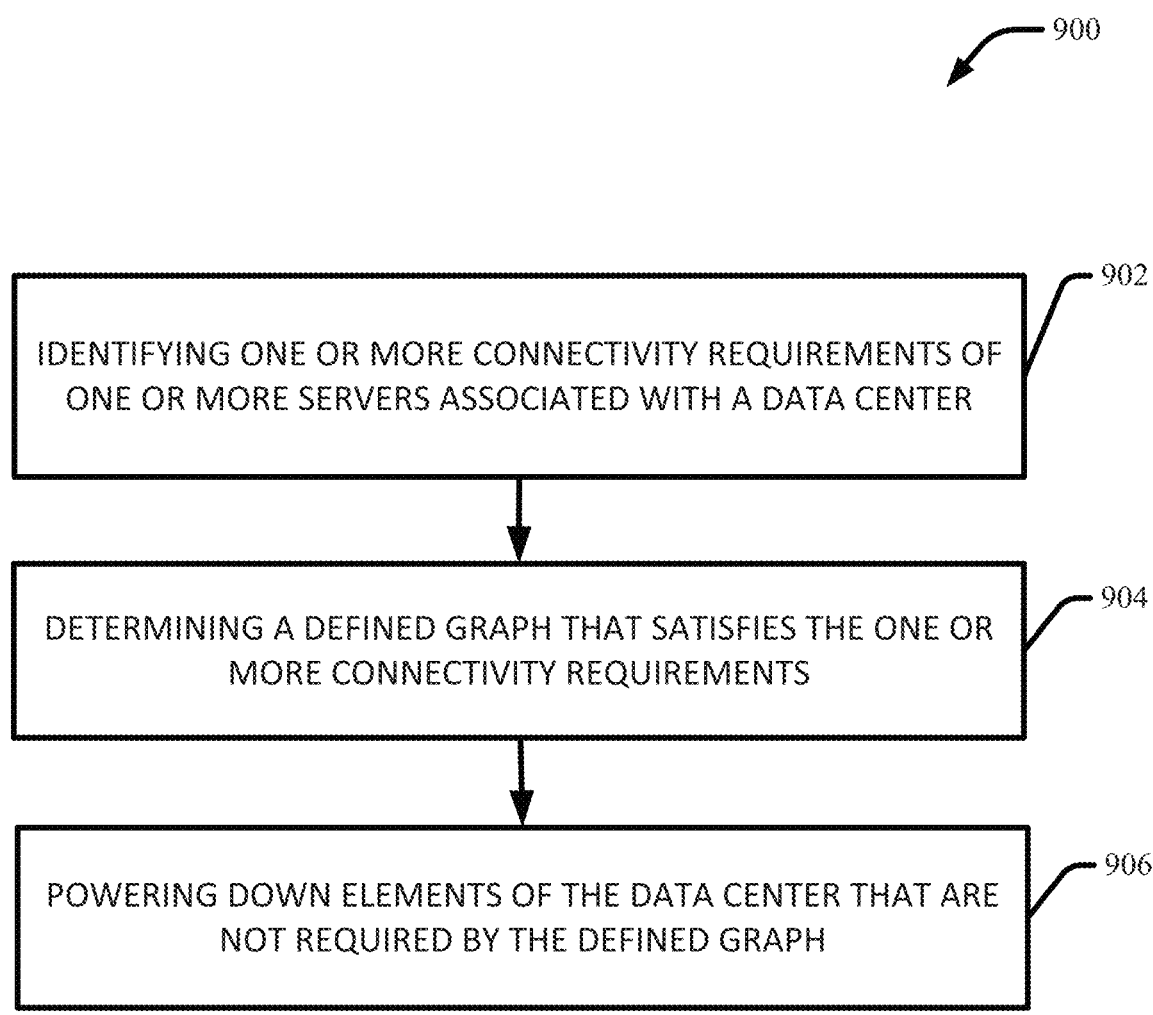
FIG. 9 an example, non-limiting methodology in accordance with one or more embodiments described herein.

FIG. 9 illustrates a flow diagram of an example, non-limiting computer-implemented method 900 that reduces power consumption in nodes in accordance with one or more embodiments described herein. Repetitive description of like elements employed in other embodiments described herein is omitted for sake of brevity. At 902, a system 300 comprising a processor 308 can identify one or more connectivity requirements of one or more nodes (e.g., network appliances) associated with the system (e.g., data center). At 904, a defined graph (e.g., defined graph 602) that satisfies the one or more connectivity requirements can be determined by the system 300 (e.g., employing load analysis component 316, power regulation component 320, update component 450 or utility component 550). At 906, one or more nodes of the data center can be powered down, placed in standby or powering savings mode by the system 300, in response to such nodes falling outside the graph and thus deemed not currently necessary to achieve present operational needs or goals of the data center.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
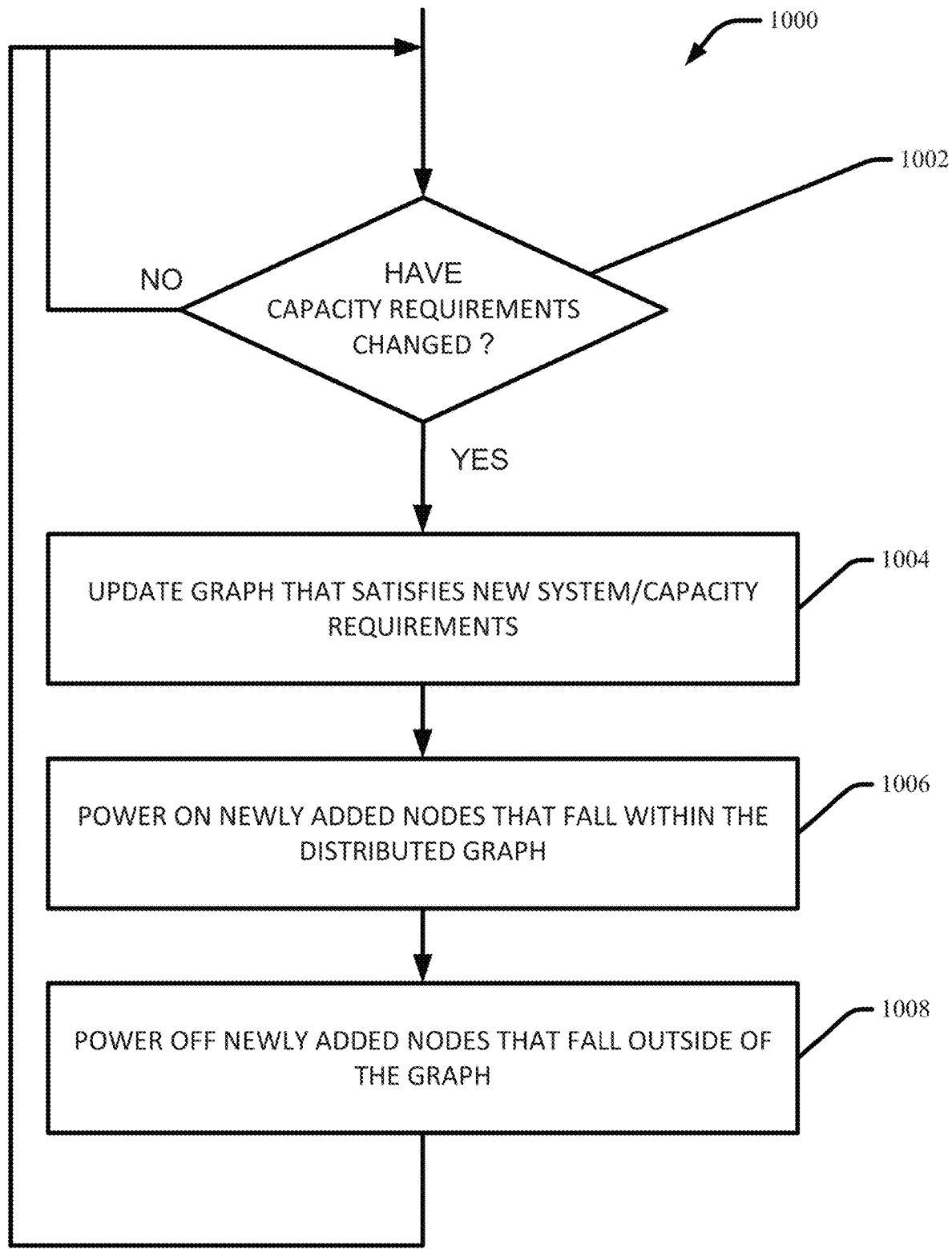
FIG. 10 an example, non-limiting methodology in accordance with one or more embodiments described herein.

FIG. 10 illustrates a methodology 1000 for updating a graph in accordance with one or more embodiments herein. At 1002, a determination is made regarding whether or not system or capacity requirements have changed (e.g., employing load analysis component 316, power regulation component 320, update component 450 or utility component 550). If no, the process returns to 1002, maintains the current graph and operation of nodes within the graph, and continues monitoring change in system/capacity requirements. If yes, the process proceeds to 1004 where the graph is updated (e.g., by update component 450) to reflect new system/capacity requirements. For example, customer demands may have increased or decreased based on time or day. At 1006, nodes that have been added to the updated graph are powered by (e.g., by the power regulation component 320). At 1008, nodes that fall outside the graph are selectively powered down, placed in standby or power save mode (e.g., by power regulation component 320), for example, to conserve power, save money and wear & tear on respective modes. The process then returns to 1002 to continue monitoring for changes in system/capacity requirements.

Figure 11:
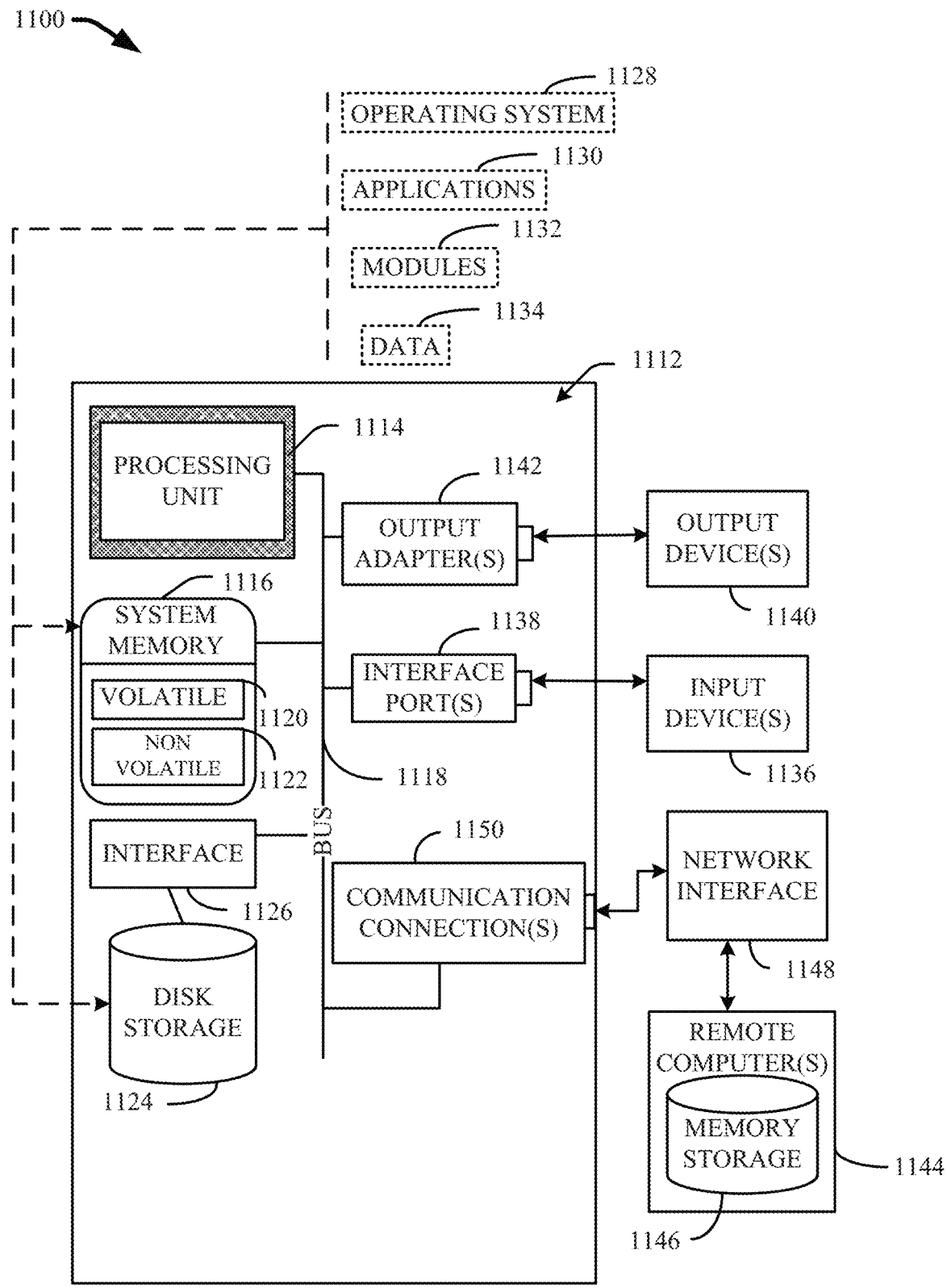
FIG. 11 illustrates an example, non-limiting, system architecture in accordance with one or more embodiments described herein.

FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1101 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements in the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1101. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Embodiments of the present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing device. Computer readable program instructions for carrying out operations of various aspects of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside in a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., in a cloud computing system.

What is claimed is:

1. A computer-implemented method comprising:
    powering down, by a device, network appliances of interdependent networks that are not required by a defined graph that comprises a minimum possible interconnectivity topology subset of nodes within a set of nodes of a data center required to fulfill system or capacity requirements of the data center, and wherein the topology;
    powering up, by the device, network appliances of the interdependent network, which are in any state other than power up, that are required by the defined graph;
    updating, by the device, the defined graph based on new system and capacity requirements, and a cost-benefit analysis; and
    employing, by the device, a machine learning system to:
        learn the network appliances of the interdependent networks, connectivity of respective network appliances and interdependencies of respective nodes of the subset of nodes; and
        build one or more models of the network appliances of the interdependent networks to select and generate a visual map a topology of a subset of nodes, wherein the map of the topology of the subset of nodes represents the defined graph.

2. The computer-implemented method of claim 1, wherein the defined graph represents a set of connectivity requirements of a set of network appliances associated with the interdependent networks.

3. The computer-implemented method of claim 1, further comprising dynamically updating, by the device, the defined graph based on changes in the system or capacity requirements, or based on scheduled changes in the system or capacity requirements.

4. The computer-implemented method of claim 1, further comprising updating, by the device, the defined graph based on inferring future increase in demand on the system or capacity requirements.

5. The computer-implemented method of claim 4, further comprising, powering up one or more network appliances based on the updated defined graph that reflects future increase in system or capacity requirements.

6. The computer-implemented method of claim 1, further comprising employing, by the electronic device, a cost-benefit utility analysis in connection with powering down network appliances.

7. A computer-implemented system, comprising:
    a processor, operatively coupled to memory, that executes computer executable components:
        a load analysis component that determines load of interdependent networks, and generates a defined graph of a subset of network appliances of the interdependent networks required to fulfill system or capacity requirements of the interdependent networks;
        a power regulation component that regulates power to respective network appliances of the interdependent networks based at least in part on whether the respective network appliances are required by the defined graph to fulfill system or capacity requirements of the interdependent networks;
        an update component that revises system and capacity requirements; and
        a utility component that performs a utility-based analysis in connection with power regulation of the respective network appliances of the interdependent networks, wherein the utility-based analysis compares a probability and a cost of potentially failing to provision services to a set of customers against a financial benefit of not including selected ones of the network appliances in the subset of network appliances.

8. The system of claim 7, wherein the power regulation component places the network appliances of the interdependent networks excluded from the defined graph in a power down, standby or power savings mode.

9. The system of claim 8, further comprising an update component that updates the defined graph based on changes in system or capacity requirements of the interdependent networks.

10. The system of claim 7, further comprising a utility component that performs a utility-based analysis in connection with costs and benefits associated with powering down, placing on standby or placing in power savings mode respective network appliances of the interdependent networks outside of the defined graph.

11. The system of claim 7, further comprising an explicitly or implicitly trained model of the network appliances of the interdependent networks that is utilized by one or more components of the system in connection with generating the defined graph.

12. A computer program product that facilitates power regulation of network appliances of interdependent networks, the computer program product comprising a computer readable storage medium having program instructions embodied therewith, the program instructions executable by a processor to cause the processor to:
power down, by the processor, a subset of the network appliances that are not required by a defined graph that represents one or more connectivity requirements of network appliances associated with the interdependent networks, and interdependencies of the network appliances; and
power up, by the processor, one or more network appliances of the interdependent networks, which are in any state other than power up, that are required by the defined graph;
perform, by the processor, a cost benefit analysis in connection with power regulation of the interdependent networks;
revise, by the processor, system and capacity requirements based on a cost-benefit analysis; and
employ, by the processor, a machine learning system to:
learn the network appliances of the interdependent networks, connectivity of respective network appliances, and interdependencies of the respective network appliances; and
build one or more models of the interdependent networks to employ in connection with inferring or determining the defined graph to select and generate a visual map a topology of a subset of nodes, wherein the map of the topology of the subset of nodes represents the defined graph.

13. The computer program product of claim 12, wherein the defined graph comprises a set of network appliances required to fulfill system or capacity requirements of the interdependent networks.

14. The computer program product of claim 12, wherein the program are executable by the processor to cause the processor to dynamically update, by the processor, the defined graph based on changes in the system or capacity requirements.

15. The computer program product of claim 12, wherein the program are executable by the processor to cause the processor to update, by the processor, the defined graph based on inferring future increase in demand on the system or capacity requirements.

16. The computer program product of claim 12, wherein the program are executable by the processor to cause the processor to employ, by the processor, a cost-benefit utility analysis in connection with powering down one or more network appliances of subset of network appliances.

17. The computer program product of claim 12, wherein the program are executable by the processor to cause the processor to power up, by the processor, one or more network appliances based on an updated defined graph that anticipates future increase in system or capacity requirements.

18. The computer program product of claim 12, wherein the one or more models is explicitly or implicitly trained.

* * * * *